United States Patent [19]

Meyers et al.

[11] Patent Number: 4,915,828

[45] Date of Patent: Apr. 10, 1990

[54] AQUARIUM FILTER

[76] Inventors: Raymond Meyers, 11 Loma Vista, Monterey, Calif. 93940; David R. Morris, 725 E. Romie La. A-4, Salinas, Calif. 93901

[21] Appl. No.: 336,833

[22] Filed: Apr. 12, 1989

[51] Int. Cl.$^4$ .......................... A01K 63/04; C02F 3/00
[52] U.S. Cl. .................................. 210/110; 210/169; 210/416.2; 210/195.1; 210/197; 210/341
[58] Field of Search ................... 210/169, 416.2, 253, 210/258, 418, 341, 110, 195.1, 197; 119/5

[56] References Cited

U.S. PATENT DOCUMENTS

| | | | |
|---|---|---|---|
| 3,768,652 | 10/1973 | Jardim | 210/169 |
| 3,957,634 | 5/1976 | Orensten et al. | 210/169 |
| 4,156,401 | 5/1979 | Ogui | 119/5 |
| 4,025,431 | 5/1977 | Saxton | 210/169 |
| 4,220,530 | 9/1980 | Gabriele | 210/86 |
| 4,265,751 | 5/1981 | Willinger | 210/169 |
| 4,267,042 | 5/1981 | Hofmann | 210/169 |
| 4,333,829 | 6/1982 | Walther | 210/169 |
| 4,606,819 | 8/1986 | Colson | 210/122 |
| 4,606,821 | 8/1986 | D'Imperio | 210/169 |
| 4,684,462 | 8/1987 | Augustyniak | 210/97 |
| 4,687,575 | 8/1987 | Grose | 210/169 |
| 4,725,353 | 2/1988 | Whitman | 210/169 |

Primary Examiner—Peter Hruskoci
Assistant Examiner—Krisanne Shideler
Attorney, Agent, or Firm—Fulwider, Patton, Lee & Utecht

[57] ABSTRACT

An aquarium filtering apparatus having a spiral prefilter connected between a siphon input line and a return water line for removing floating debris wherein the return line cycles a portion of the return water through a "dry" biological filter for decomposing biological waste and through a chemical stage filter for eliminating undesirable chemical waste from the aquarium water, the filtering apparatus further including a concentric tube arrangement having an outer inlet tube for receiving water from the spiral prefilter and an inner inlet tube for receiving water from the chemical stage filter, the prefilter operating in paralle with the biological and chemical stage filters permitting the concentric tube arrangement to maintain a pair of water levels within the aquarium filter by utilizing a single submersible pump, the pair of water levels ensuring that the pump remains submersible and the biological filter remains non-submersible which minimizes filter recycling time and improves filter efficiency while being packaged in a single compact unit.

20 Claims, 2 Drawing Sheets

AQUARIUM FILTER

BACKGROUND OF THE INVENTION

This invention relates to filter devices for use in fish aquariums, and more particularly, to a compact aquarium filter device of the type having a combination of differing filter elements and a concentric tube arrangement which permits drawing water through parallel filters with a single pump.

In the field of aquarium maintenance, the use of filter devices has long been recognized as an effective method of removing debris, biological waste and undesirable chemicals from an aquarium tank. Many of the filter systems were comprised of a plurality of different filter elements connected in a tandem or series arrangement. Such a series arrangement tended to dramatically slow down the filtering process since the entire process was limited by the slowest filter element. The slowest filter element tended to be the "dry" biological filter element. Substantial time was required for the tank water to cascade across the biological element to aerate the bacteria residing in the filter.

In the past, efforts were made to reduce the filtering cycle time across the biological filter by increasing the surface area thereof. Although the cycling time may have been reduced, the size of the "dry" biological filter was substantially larger and thus incompatible for use in a compact filter device designed for being mechanically attached to a side of the aquarium.

Other efforts in the past have been directed to problems associated with aquarium filters. In particular, there is known a recirculation water filtration and aeration system designed specifically for aquariums. Water drawn from the aquarium tank was prefiltered in a water level control device before being conveyed to an external filter means. The filtered water or filtrate was dispensed from a spray bar having a plurality of horizontally spaced small openings for discharging the filtered water to a pair of filter media trays which contained filter media and aerobic bacteria. The function of the filter media and aerobic bacteria was to clean the aquarium water as it was percolated downward across the filter media and into a reservoir. The filtered water was drawn from the reservoir by a pump which discharged the filtered water through a tube to the top of the aquarium tank.

Another attempt to solve the problems associated with aquarium filters was directed to an aquarium filtration system which was comprised of an assembly of coaxial tubes. The aquarium filtration system was located beneath a surface level of gravel at the bottom of the aquarium tank. The under-gravel filtration system filtered the water from the upper tank by employing the existing aquarium gravel system in conjunction with the biological action of an additional fine sand filter supported on a screen mesh. The combination of the aquarium gravel system and the fine sand filter provided double filtration of the water whereby the clean filtered water was supplied through a supply tube but was not fed back to the biological fine sand filter thereafter.

Another water filter was directed to the use with aquariums wherein the water filter included a filter cartridge. The filter cartridge was comprised of an outer tube and a coaxial inner tube, both inner and outer tubes having perforations formed therein. However, the flow of fluid through the perforations formed into the inner tube also passed through the perforations formed in the outer tube. Since the two tubes drew fluid from the same chamber, distinctly different water levels for different filter elements within the water filter were not maintained.

Still another aquarium filtration system included a filter housing comprised of a first chamber, a second chamber and a third chamber. Each of the chambers could operate at a water level independent of the other two chambers. The variation in water level in the different chambers was responsive to the hydrostatic pressure and porosity of the filtering medium. Thus, the fluid level in any of the three chambers tended to rise when the filter media became plugged with impurities.

Finally, a self-cleaning aquarium system is known in the past and included a concentric tube arrangement whereby water was withdrawn from the aquarium tank through an outermost tube of the concentric tube arrangement. The aquarium water drawn from the tank through the outermost tube was directed to a plurality of openings where the water was then directed into a plurality of filters. After the filtration cycle, the filtered water was pumped back to the aquarium tank through an innermost tube of the concentric tube arrangement, the innermost tube being coupled to a pump mounted therein.

Hence, those concerned with the development and use of filtering systems in the aquarium maintenance field have long recognized the need for an aquarium filter comprised of a plurality of filtering elements packaged in a single compact unit wherein the filtering elements are connected in a parallel arrangement and the aquarium filter includes a concentric tube arrangement for directing aquarium water to and from distinct filtering elements, wherein only a single submersible pump is required for driving the aquarium water through the plurality of parallel connected filtering elements and the single pump is capable of maintaining multiple water levels for providing maximum operating efficiency of the aquarium filter.

Further, there is a recognized need for an improved aquarium filter which provides a more stable, stress-free environment for providing a better gas exchange, a more consistent pH level, a dissolved oxygen level content at or near saturation, advanced prefiltration with long periods between service intervals, a biological filter capable of filtering a higher aquarium population and having a faster response to changes in the biological load. The present invention fulfills all of these needs.

SUMMARY OF THE INVENTION

Briefly, and in general terms, the present invention provides a new and improved aquarium filter construction having a plurality of parallel connected filter elements packaged in a compact unit which substantially reduces the time required to filter the aquarium water, and which significantly increases the efficiency of the filtering process over similar types of prior art filters. Moreover, the filter construction of the present invention utilizes a concentric tube arrangement for simultaneously drawing filtered water from a pair of the filter elements which permits employing a single pump for maintaining multiple water levels with the aquarium filter, supplies oxygen to the filter bacteria by regulating the water flow to keep the biological elements "dry", provides a more consistent pH level, provides an advanced prefilter stage requiring minimum maintenance, and a biological element capable of filtering a higher aquarium population with a faster response to biological load changes.

Basically, the present invention is directed to an improved aquarium filter for increasing the efficiency of and reducing the time required to complete the filtering process. This is accomplished by modifying the design of the filter by incorporating a plurality of parallel connected filter elements packaged within a compact unit.

In accordance with the invention, the aquarium filter is comprised of a completely submerged spiral prefilter, a biological stage filter which remains substantially exposed to air for providing proper and efficient operation, and a completely submerged chemical stage filter, the prefilter being connected in parallel with each of the biological and chemical stage filters.

In accordance with the improved operation of the present invention, water from the aquarium tank is drawn into the filter by a siphon tube and is subjected to the prefiltration stage by being drawn through the spiral prefilter and into a holed tube connected to a submersed pump. The majority of the water is then directed back to the tank through a water return line while a portion of the water is recycled through the "dry" biological filter and through the chemical stage filter. The cascading effect on the water through the biological filter maximizes aeration of the filter bacteria, enhancing the filtering effect.

A pair of water levels are maintained by employing the concentric tube arrangement so that the ratio of water being drawn into the filter through the concentric tubes is balanced with the amount of water being returned to the aquarium and being recycled through the entire filter. The discharge flow rate can be regulated to achieve the equilibrium.

The new and improved aquarium filter of the present invention comprises multiple parallel connected filter elements packaged in a single compact unit which reduces the filtering time and increases the efficiency of the filtering process. Also, the filter construction utilizes the concentric tube arrangement for drawing filtered water from a pair of filter elements permitting the use of only a single pump for maintaining multiple water levels within the filter which improves the efficiency thereof.

These and other features and advantages of the invention will become apparent from the following more detailed description, when taken in conjunction with the accompanying drawings, which illustrate, by way of example, the features of the invention.

DETAILED DESCRIPTION

As shown in the drawing for purposes of illustration, the invention is embodied in an aquarium filter 100 of the type having a parallel connected submerged spiral prefilter 102 for filtering large debris, and a "dry" biological filter 104 in series with a submerged chemical stage filter 106 for breaking down biological waste and for removing waste chemicals, respectively, and a concentric tube arrangement comprised of an inner inlet tube 108 positioned within an outer inlet tube 110 for providing independent filter operation and maintenance of separate water levels within the aquarium filter 100.

Many of the aquarium filter systems of the past were comprised of a plurality of different filter elements connected in a series arrangement. Such an arrangement tended to dramatically slow the filtering process since the entire process was limited by the slowest filter element which tended to be the biological filter element. Consequently, substantial time was required for the water to cascade across the biological element to aerate the bacteria residing in the filter. Even if the surface area of the filter was increased to reduce the cycling time across the biological filter, the size of the biological filter was substantially increased resulting in incompatibility for use in a compact filtering device.

A recirculation water filtration and aeration system designed specifically for aquariums caused water drawn from an aquarium tank to be prefiltered in a water-level control device. Thereafter, the prefiltered water was conveyed to an external filter means wherein the filtered water was dispensed from a spray-bar having a plurality of small openings for discharging the filtered water to a pair of filter media trays which contained filter media and aerobic bacteria. The filter media and aerobic bacteria functioned to clean the aquarium water as it was percolated downward across the filter media into a reservoir. A submersible pump mounted within the reservoir was employed for discharging filtered water back to the aquarium tank.

A water level control device was provided and comprised a water overflow receptacle and a prefilter receptacle. The overflow receptacle was generally rectangular shaped having a bottom, back, front and end walls. The top edge portion of each side wall and the front walls included a plurality of vertically disposed, narrow slots which were sufficiently large so as to permit the free passage of water and foreign matter from the tank to the overflow receptacles. The slots were, however, small enough to prevent the passage of fish and other marine life therethrough.

The slots in the overflow receptacle approximated a predetermined level of water desired to be maintained in the aquarium tank. Thus, the entire overflow receptacle was adjusted vertically until the horizontal plane containing the bottoms of the vertically extending slots approximated the predetermined level of water desired in the aquarium tank.

Another aquarium filtration system included an assembly of coaxial tubes within an aquarium which drew water through a conventional under-gravel filtration system of the aquarium and communicated the initially filtered water through a fine sand filter assembly located in a separate tank below the aquarium. The filtered water in the lower tank was then pumped upward through the innermost tube of the coaxial tube assembly and returned to the aquarium. A water conduit, which surrounded the water supply tube, extended upward to the desired water level of the aquarium, and the conduit was axially adjustable to vary the water level. A casing surrounding the water conduit had an open bottom and allowed water from the under-gravel filtration system to pass upwardly to the top of the water conduit, where it was drained to the filter assembly in the lower tank.

Another example included an aquarium water filter comprised of a filter chamber having a water inlet and a water outlet and being filled with exchangeable filter material and having a boost pump arranged downstream of the water inlet. The filter chamber was defined by an annular space between two concentric tubes of different diameters, the outer tube having as a water inlet a perforation arranged and spaced around its entire circumference and its entire length and the inner tube likewise being provided with a perforation around its entire circumference and length. At one end of the inner tube, a water outlet line was connected while the other end of the inner tube was closed. By employing the structure, the entire filter material employed could be completely utilized while additionally simplifying the exchange of the filter material.

Other aquarium filtration systems included a plurality of chambers, each of which could operate at a water level independent of the other chambers. The variation in water level was responsive to the hydrostatic pressure and porosity of the filtering element while the tank filter included a maze-like passageway with a filtering medium arranged therein through which waste water from the fish tank was passed. A clogging indicator associated with the passageway was provided for signaling the filtering condition of the medium.

Another example included a sealed liquid filled tank carried above a liquid containing reservoir wherein a pump mounted within the reservoir forced liquid upwardly through an interconnected conduit into the tank. An overflow pipe in the tank directed the liquid back into the reservoir through filters. Feeding means were provided in the conduit so that food could be supplied without unsealing the aquarium tank. Also included was a concentric tube arrangement whereby water was withdrawn from the tank through an outermost tube to a plurality of openings where the fluid was dropped into filters. The filtered water was then pumped back to the tank through an innermost tube which was coupled to the submersible pump.

The function of a skimmer box is to skim water off of the surface of the aquarium tank for removing surface active organic material. Biologically, there are several types of waste located in the aquarium tank that are attracted to oxygen and repelled by water. These wastes congregate on the water surface within the tank and must be removed by some method such as, for example, by being skimmed off. Failure to remove these wastes resulted in a surface layer that interfered with filtering action.

In the past, the layer of surface active organic material was broken up by the formation of bubbles associated with surface agitation as with water jets. However, the wastes were not actually removed. This was accomplished in the past by incorporating an L-shaped screen through which water flowed. One side of the L-shaped screen included a plurality of slots. The narrow slots allowed the passage of water while preventing the escape of fish into a mechanical filter. The screen created turbulence adding oxygen to the aquarium and driving off carbon dioxide and further controlled a waterfall by creating a difference in water levels in different sections. However, it was necessary to maintain a constant water level in the aquarium tank. If the water fell below the level of the slots, the water supply disappeared and the pump was cycled off. Generally, each of the slots were $\frac{1}{4}$" wide, $\frac{1}{2}$" deep and appearing on three sides of the water level control device.

In accordance with the present invention, the spiral prefilter 102, the "dry" biological filter 104 and the chemical stage filter 106 cooperate with the concentric inlet tubes 108, 110 to substantially reduce the time required to filter the aquarium water and to significantly increase the efficiency of the filtering process by the aquarium filter 100. Further, the use of concentric inlet tubes for simultaneously drawing filtered water from the pre-filtered element 102 and the chemical stage filter 106 permits employing a single submersible pump 112 for maintaining a pair of water levels 114, 116 within the aquarium filter, supplies oxygen to the filter bacteria by regulating the water flow to keep the biological element "dry", provides a consistent pH level, provides a low maintenance prefilter stage, and a biological filter capable of filtering a higher aquarium population with a faster response to biological load changes.

The aquarium filter 100 is designed to be a single compact unit which may be attached to the side of a fish tank aquarium 117 by any suitable means, for example, by hook members or by clamping. The compact size requires the aquarium filter to be a maximum of $3\frac{1}{4}$" wide so that the filter will fit behind any standard plexiglass or glass aquarium without modification. The aquarium filter is completely self-contained and includes a siphon tube 118 which is utilized for drawing water from the aquarium tank 117 into the aquarium filter 100. The siphon tube 118 draws water directly from the aquarium tank 117 by any means known in the art, for example, such as by a skimmer box 119 combined with an automatic adjusting gate 121. In such a case, the aquarium water would be exhausted from the top of the skimmer box in a skimming effect for removal of surface active organic material as will be described in FIGS. 2, 3A and 3B.

The volume of aquarium water fed into the filter 100 is limited because the top level of the aquarium filter is positioned to be level or higher than the top of the aquarium tank. The filter is positioned adjacent to the tank in this manner so that the siphoning effect is limited. This prevents the aquarium filter 100 from flooding which would result in the biological filter 104 becoming immersed in the water. Such action would reduce the efficiency of the aquarium filter. If the top level of the aquarium filter were placed below the top level of the aquarium tank, the siphoning effect would draw additional volumes of water into the filter.

Figure 1:
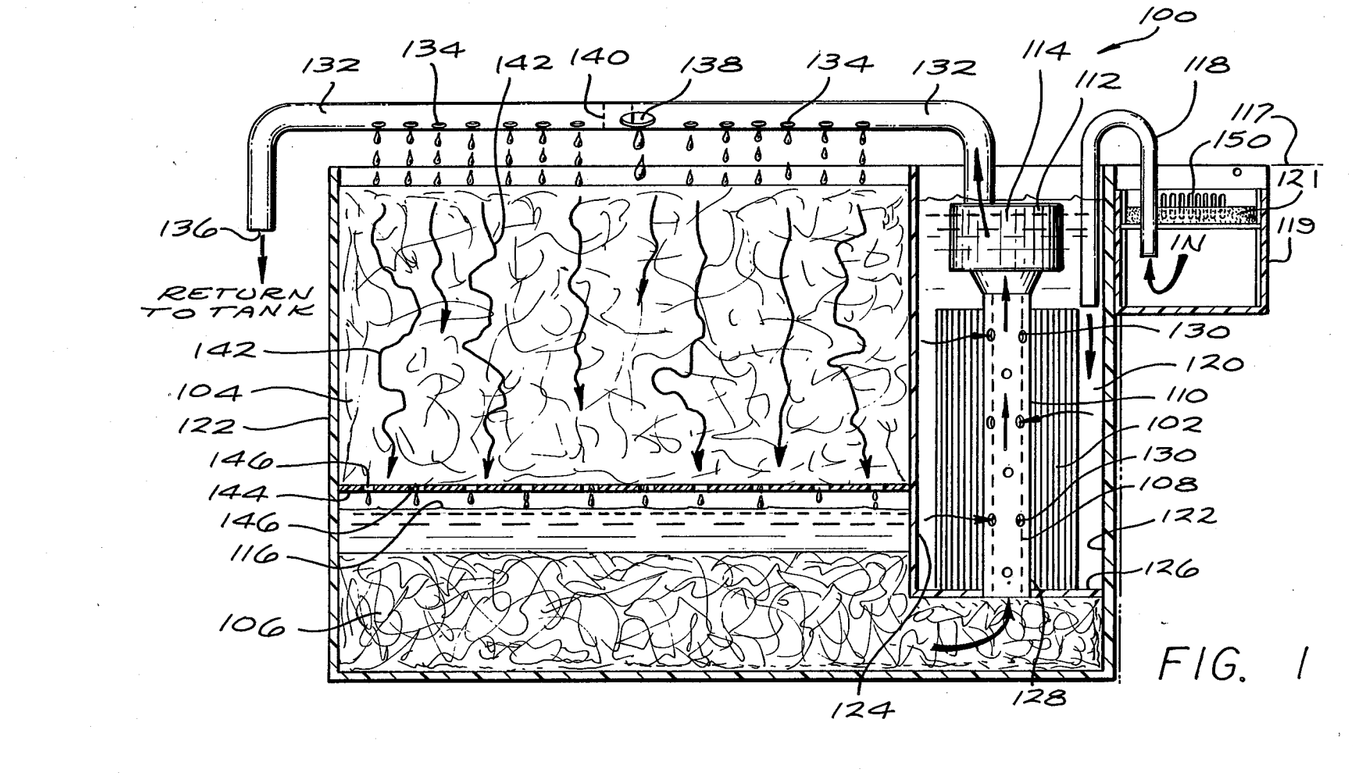
FIG. 1 is a frontal elevational view partially in section of an aquarium filter in accordance with the present invention.

Once the aquarium water is siphoned into the tube 118, the water is directed to a prefiltration region 120 which surrounds the spiral prefilter 102 as is shown in FIG. 1. The prefiltration region 120 is bounded by a pair of sidewalls 122, 124 and a floor portion 126. The spiral prefilter 102 is cylindrical in cross-section having a penetration 128 passing therethrough. Extending through the penetration 128 of the spiral prefilter 102 are both the inner inlet tube 108 and the outer inlet tube 110. Note that the inner inlet tube 108 is connected directly between the chemical stage filter 106 and the submersible pump 112 while the outer inlet tube 110 is connected between the prefiltration region 120 and the submersible pump 112.

The prefilter 102 is a mechanical filtration device having a spirally wrapped filter design which provides a dramatic increase in filter surface area. Further, the spiral design permits long intervals of time to lapse between required maintenance periods. The water being drawn from the aquarium tank 117 through the siphon tube 118 tends to seek a new and clean passageway through the filter media. This action prevents the accumulation of particulates from being further broken down by bacteria in the water which would add to the organic levels of the water. The media material effectively prevents the prefilter 102 from becoming a biological filter by removing debris without decomposing the debris from within the prefilter 102. Thus, the spirally wrapped mechanical filter does not become a biological filter as would a conventional filter pad without frequent servicing periods. Thus, the major function of the spiral prefilter 102 is to eliminate debris resident within the water siphoned from the aquarium tank.

After the water is drawn through the siphon tube 118 and enters the prefiltration region 120, it passes through the spiral filter 102. After passing through the spiral filter, the aquarium water interfaces with the outer inlet tube 110 which passes through the penetration 128 of the prefilter. Located along the outer surface of the outer inlet tube 110 is a plurality of inlet holes 130 which permit the aquarium water to pass into the area between the outer inlet tube 110 and the inner inlet tube 108. The water is caused to move in the upward direction due to the action of the submersible pump 112 and to be driven into a water return line 132. Note that because the prefiltration region 120 is totally separated from the remainder of the aquarium filter 100 by the sidewalls 122, 124, and the floor portion 126, all of the incoming aquarium water must pass through the spiral prefilter 102.

The water return line 132 includes a plurality of drain holes 134 which are employed for returning a portion of the prefiltered aquarium water to the biological filter 104 in a loop circuit manner. Thus, as the high output submersible pump 112 forces the prefiltered water into the water return line 132, a certain portion of the return water is directed back into the aquarium filter 100 under pressure while the remainder of the water is directed to a terminal end 136 of the water return line back to the aquarium tank. The combination of the biological filter 104 and the chemical stage filter 106 forms a feedback loop circuit which eventually passes and filters a major portion of the volume of aquarium water passing through the filter 100. During each cycling phase, the remainder of the aquarium water is actually pumped back to the aquarium tank via the water return line 132.

Also formed within the water return line 132 is a regulating hole 138 which operates in conjunction with a slidable flow gate 140 for controlling the amount of water passing through the regulating hole 138 into the biological filter 104. The positioning of the manual sliding flow gate 140 controls the water pressure and levels within the aquarium filter 100 as will be described hereinafter.

On the return path to the aquarium 117, the water passes through the loop circuit where it is drained or sprayed from the drain holes 134 over the biological filter 104. The biological filter may be comprised of a group of vertical poly-fiber pads, separated by a plastic spiral material in a non-submerged (dry) environment. The main function of the biological filter 104 is to eliminate contamination which has accumulated from the resident fish and the associated environment. The biological filter 104 permits the decomposition of biological waste from the resident fish living within the aquarium. The decomposition permits the biological waste to be reduced to basic chemical components and is accomplished by nitrifying bacteria that is permitted to grow within the biological filter 104. It is important to aerate the bacteria to promote the decomposition of the waste materials.

Nitrifying bacteria are therefore provided with an unlimited source of oxygen so that the bacteria can propagate throughout the enormous surface area provided by the multitude of individual fibers on a poly-fiber pad 142. This construction allows the bacteria to respond rapidly to the necessary density required to compensate for changes in the biological load. Excess ammonia caused by overfeeding or a change in the aquarium resident population will be quickly corrected by the biological filter 104.

The performance of the biological filter 104 is significantly improved by creating a perfect environment for nitrifying bacteria. Such an environment results from a large surface area in direct contact with the atmosphere, free from organic particulate. Therefore, the filter media of the biological filter is placed in vertical sheets to maximize the surface area, gas exchanges and flow characteristics for bacteria growth. The biological filter 104 must remain substantially exposed to the air in order for proper aeration to occur which results in a more efficient operation.

In contrast, the spiral prefilter 102 is completely submerged in the aquarium water located in the prefiltration region 120. Because the biological filter is substantially exposed to air, it is referred to as a "dry" filter. Such a construction permits the prefiltered aquarium water to be sprayed under pressure onto the dry filter in a cascading effect down through an open structured support medium which maximizes the aeration of the bacteria residing within the dry filter. The dry biological filter 104 is retained in position by the prefiltration sidewalls 122, 124 wherein the sidewall 122 is also an external sidewall of the aquarium filter 100. The dry filter 104 is supported from the bottom by a support wall 144 which includes a plurality of vertical penetrations 146.

As the aquarium water cascades down through the dry filter 104, droplets of biological filtered water pass through the vertical penetrations 146 into the chemical stage filter 106. The chemical stage filter is a completely submerged "wet" filter section which is provided underneath the area of the biological filter 104. The major function of the chemical stage filter 106 is to remove waste chemicals from the water. Thus the water passing through the plurality of vertical penetrations 146 formed in the support wall 144 may be drawn through a chemical substrate medium such as crushed coral or dolomite. These elements are provided for pH control, while activated carbon or resins are provided for additional chemical filtration. The substrate should be placed in a nylon bag prior to insertion into the aquarium filter 100. This action provides for easy removal upon replacing the chemical substrate. The chemical stage filter 106 is completely submerged in biologically filtered water below the low water level 116 as is shown in FIG. 1.

After passing through the chemical stage filter 106, the filtered water is drawn up through the inner inlet tube 108 which is connected directly to the intake side of the high outlet submersible pump 112. The inner inlet tube 108 is separated from the outer inlet tube 110 and thus the filtered water passing through the biological filter 104 and the chemical stage filter 106 is not integrated with the water in the spiral prefilter 102 until the high output submersible pump forces the water from both sources into the water return line 132. Thus, a major advantage of the instant invention is that by employing the inlet tubes 108, 110, the single submersible pump 112 may be utilized to draw the water from both the chemical stage filter 106 and the spiral prefilter 102 simultaneously. Such a construction greatly increases the filter efficiency by incorporating in the single aquarium filter 100 a combination of three filter elements which have not heretofore been combinable in a parallel combination and driven by a single submersible pump. The combination of the spiral prefilter 102, the biological filter 104 and the chemical stage filter 106 packaged in a single compact unit that attaches to the side of the aquarium tank is believed to be novel and non-obvious.

Another novel feature associated with the instant invention is that two water levels simultaneously exist within the aquarium filter 100. The first is the high water level 114 existing in the prefiltration region 120 located above the submersible pump 112. The second is the low water level 116 existing above the chemical stage filter 106 and beneath the support wall 144 below the biological filter 104. The high water level 114 is controlled by the amount of water passing through the spiral prefilter 102 and the plurality of inlet holes 130 of the outer inlet tube 110. However, the low water level 116 located above the chemical stage filter 106 is controlled by the amount of water being drawn upward through the inner inlet tube 108 which bypasses the spiral prefilter 102 and transmits chemically filtered water to the water return line 132.

Thus the two different water levels 114, 116 are maintained by the use of the concentric tube arrangement of the inlet tubes 108, 110. In order for an equilibrium in water levels to be maintained, the ratio of the amount of water being drawn into the inlet holes 130 of the outer inlet tube 110 to the amount of water being drawn in through the inner inlet tube 108 must be kept equal to the ratio of the amount of water spraying out of the plurality of drain holes 134 of the water return line 132 to the amount of water returning to the aquarium tank from the terminal end 136 of the water return line. In order to fine tune this equilibrium ratio, the flow gate 140 is slidably adjustable to cover just enough of the regulating hole 138 on the water return line 132 to achieve such an equilibrium.

The slidable flow gate 140 is utilized to control the opening of the regulating hole 138 within the water return line 132. If the amount of recycled water flowing out of the regulating hole 138 is controlled, and if the amount of water flowing into the inlet holes 130 of the outer inlet tube 110 from the prefiltration region 120 is controlled, the low water level 116 can be controlled. By controlling the low water level 116, the biological filter 104 can remain "dry" thus permitting maximum aeration of the bacteria resident therein increasing the overall efficiency of the aquarium filter 100. However, if the flow gate 140 is positioned so that the regulating hole 138 permits prefiltered water to drain at a greater rate than inlet water entering the holes 130 of the outer inlet tube 110, the biological filter will become "wet" thus compromising the efficiency of the aquarium filter 100.

Because the spiral prefilter 102 is segregated from the biological filter 104 and the chemical stage filter 106, the level of water in the prefilter does not affect the low water level 116. If the biological filter 104 becomes "wet" due to a reduction in aeration, the flow gate 140 must be adjusted by trial and error until the respective flow rates are equal.

Maintenance of the high-water level 114 within the prefiltration region 120 is automatic since use of the siphon tube 118 requires that the level of water in the aquarium filter 100 seek the level of water in the aquarium tank 117. If the aquarium filter is placed below the water level of the aquarium tank, the siphon tube 118 will cause the aquarium filter to overflow resulting in the biological filter 104 becoming "wet" and thus compromising efficiency. However, if the top of the aquarium filter 100 is placed above the water level of the aquarium tank, the level of water drawn into the aquarium filter would be lower. Such a condition could be detrimental to the submersible pump 112 because of a potential overheating condition. Therefore, it is the inlet tubes 108, 110 which permit simultaneously maintaining the two water levels 114, 116 which is a novel and non-obvious feature of the instant invention. The existence of the two water levels enables the combining of the three different filter elements in a single compact filtering unit driven by the single submersible pump 112.

Figure 2:
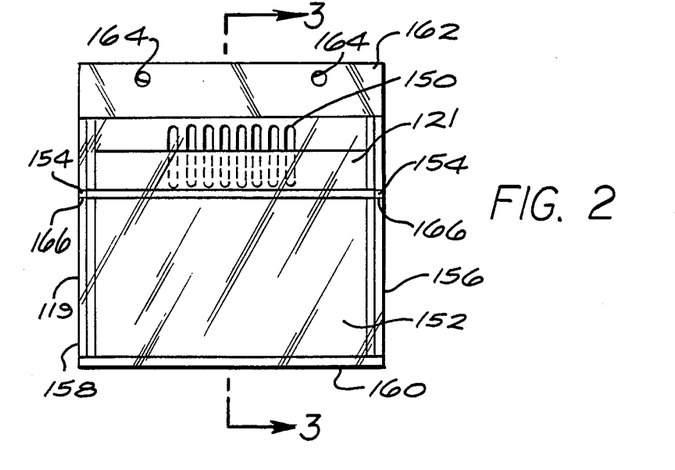
FIG. 2 is a detailed frontal elevational view of a skimmer box of the aquarium filter of FIG. 1.

The function of the skimmer box 119 is to provide a means by which the surface active organic material may be skimmed from the top of the water level within the aquarium tank 117. Unlike many of the aquarium feeding systems of the past, the surface active organisms are actually removed from the top surface of the aquarium tank. In particular, the skimmer box 119 includes a plurality of windows 150 formed in only a forward wall 152 of the skimmer box as shown in FIG. 2. The function of the plurality of windows is to pass aquarium water from the tank into the skimmer box while blocking plants and animal life from passing from the tank into the skimmer box. The plurality of windows 150 are actually slots formed into the forward wall 152 and are approximately ⅛" wide and 1⅛" deep. The depth of the windows 150 is one of the distinct advantages associated with the skimmer box 119 since the water level of the aquarium tank 117 can drop as much as 1" while permitting significant skimming action to continue to occur.

The adjusting gate 121 is located inside the skimmer box 119 and is approximately ¾" high and extends across the entire horizontal front of the skimmer box 119. The bottom edge of the gate 121 is aligned along the bottom edge of the plurality of windows 150 as is shown in FIG. 2. The gate is secured behind the plurality of windows inside the skimmer box 119. The gate 121 is comprised of, for example, plastic and is routed out and includes a pair of ears 154 extending from each side of the gate. In addition to the forward wall 152, the skimmer box also includes a pair of lateral walls 156, 158, a bottom wall 160 and a suspension flap 162. Formed within the suspension flap is a pair of mounting holes 164 utilized for mounting the skimmer box 119 to the aquarium filter 100.

It should be noted hat although the skimmer box 119 is shown mounted adjacent to the prefiltration region 120 in FIG. 1, the skimmer box is, in practice, actually mounted in front of the prefiltration region. However, in order to minimize confusion and improve the clarity of the construction of the present invention, the skimmer box 119 has been shown as is illustrated in FIG. 1. Therefore, the pair of mounting holes 164 may be employed for receiving a mechanical fastener which is secured within, for example, a plexiglass cover of the prefiltration region 120 which surrounds the submersible pump 112.

Figures 3A, 3B:
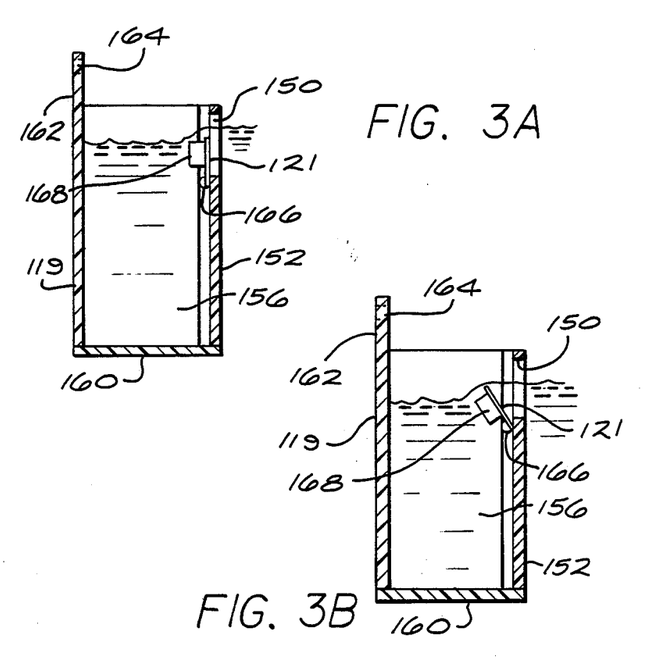
FIGS. 3A-3B are cross-sectional views of the skimmer box taken along the line 3—3 of FIG. 2.

Formed within each of the lateral walls 156, 158 is a small hole 166 of approximately 3/16" diameter. Each hole 166 is positioned within the lateral wall so that the bottom of the gate 121 is at a level which is approximately equivalent to that of the bottom of the plurality of windows 150. The pair of ears 154 are each seated within one of the small holes 166 so that the gate may pivot about the ears as is shown in FIGS. 3A and 3B.

The main function of the adjusting gate 121 is to control the flow of water from the aquarium tank 117 to the skimmer box 119. Note that the back side of the gate 121 includes a piece of buoyant material 168 affixed thereto. The buoyant material may be, for example, styrofoam which may be affixed as by use of an adhesive. The function of the buoyant material is to convert the gate to a flotation device as is shown in FIG. 3A.

The water level in the skimmer box 119 is directly dependent upon the water level in the aquarium tank 117. Each time the water level in the aquarium tank is altered, the water level in the skimmer box also changes. Under the conditions where the water level in the aquarium tank is high, the water level in the skimmer box 119 will also be high. Therefore, the buoyant material 168 affixed to the gate 121 causes the gate to be pivoted along the plurality of ears 154 to a vertical position as is shown in FIG. 3A. Thus, when the aquarium filter 100 is operational, the position of the gate 121 as shown in FIG. 3A partially blocks a portion of the plurality of windows 150 so that the amount of water entering the skimmer box 119 from the aquarium tank 117 is controlled. Therefore, because of the positioning of the adjusting gate 121, less water enters the skimmer box from the aquarium tank when the water level in the tank is high providing significant water level control.

When the gate 121 is positioned high on the plurality of windows 150, the flow of water into the skimmer box is restricted because part of the window area is blocked. This construction lowers the water level in the skimmer box 119 to a level below the water level in the aquarium tank 117. This feature is important because the skimmer box is then able to draw off only the surface water containing the active organisms and other wastes from the aquarium water. Thus, the plurality of windows 150 are employed for allowing the skimmer box 119 in a controlled manner. The gate 121 functions like a dam against the windows 150 and provides for a water cascading effect from the tank to the skimmer box.

However, when the water level in the aquarium tank 117 drops, the position of the gate 121 in the skimmer box 119 is adjusted proportionately to the lower water level. This action causes the gate 121 to drop open by pivoting about the pair of ears 154 within the pair of mounting holes 164 as shown in FIG. 3B. The gate is then postured to expose more of the plurality of windows 150 for admitting more of the aquarium water into the skimmer box 119. Although the water in the aquarium tank 117 may have dropped resulting in a corresponding drop in the water level of the skimmer box, an advantage of the present construction is that significant skimming action for removing the surface active organisms still occurs.

Once the water level in the skimmer box 119 has reached a level proportional to the water level in the aquarium tank 117, the siphon tube 118 which may include a plurality of tubes can begin to remove the surface active organic material from the water surface in the skimmer box. To facilitate the movement of aquarium water from the aquarium tank 117 to the skimmer box 119, the water level in the tank is slightly higher than the water level in the skimmer box. Likewise, to facilitate siphoning of the surface water in the skimmer box by the siphoning tube 118, the water level in the skimmer box is slightly higher than the water level in the prefiltration stage 120 of the aquarium filter 100.

The construction of the plurality of windows 150 provides a narrower and a deeper window slot for ensuring more control over the water flow from the aquarium tank 117 to the skimmer box 119. The top of each window is terminated prior to reaching the top of the forward wall 152 so that the plurality of windows do not form fingers as was commonly done in the past. The plurality of windows are approximately 1⅜" deep, and such a construction is advantageous since fingers of that length would result in extensive breakage. Therefore, the present invention provides a construction which is more convenient, minimizes damage to the forward wall 152 of the skimmer box 119, and significantly improves the water control mechanism between the aquarium tank and the skimmer box.

It should be noted that the aquarium filter 100 maintains a more stable, stress free environment for the resident fish by providing a better gas exchange, a more constant pH level, a dissolved oxygen level at or near saturation, an advanced prefilter 102 requiring minimum maintenance, and a biological filter 104 capable of filtering a high aquarium population with a faster response to biological load changes.

From the foregoing, it will be appreciated that the aquarium filter 100 of the present invention reduces the time required to filter the aquarium water and also increases the efficiency of the filtering process. Further, utilization of the concentric inlet tubes 108, 110 for simultaneously drawing filtered water from the prefilter 102 and the chemical stage filter 106 permits employing the single submersible pump 112 for maintaining the multiple water levels 114, 116 within the aquarium filter 100. Since the filter 100 is designed to incorporate the parallel connected prefilter 102 with the "dry" biological filter 104 and the chemical stage filter 106 in a single compact unit, space is economized further contributing to the desirability of the filter.

While a particular form of the invention has been illustrated and described, it will be apparent that various modifications can be made without departing from the spirit and scope of the invention. Accordingly, it is not intended that the invention be limited except as by the appended claims.

We claim:

1. An aquarium tank filtering apparatus comprising, in combination:
   means for drawing a volume of water from said aquarium tank into said filtering apparatus;
   means for prefiltering said volume of water for removing debris, said prefiltering means being segregated within said filtering apparatus;
   means for pumping said prefiltered water to a water return line, said water return line including means for recycling a portion of said prefiltered water through said filtering apparatus;
   means for biologically filtering said prefiltered water, said biological filtering means receiving said recycled portion of said prefiltered water for decomposing biological waste within said volume of water, said biological filtering means being arranged for parallel operation with said prefiltering means;
   means for chemically filtering said volume of water, said chemical filtering means receiving said recycled portion of said prefiltered water from said biological filtering means for removing chemical waste from said volume of water, said chemical filtering means being arranged for series operation with said biological filtering means and for parallel operation with said prefiltering means; and means for maintaining a pair of water levels within said filtering apparatus, said maintaining means comprising a concentric tube arrangement for drawing said volume of water and said recycled portion of said filtered water into said pumping means, said pair of water levels being provided for simultaneously retaining said pumping means in a submerged condition and said biological filtering means in a non-submerged condition.

2. The filtering apparatus of claim 1 wherein said means for drawing a volume of water comprises a siphon tube.

3. The filtering apparatus of claim 1 wherein said means for prefiltering said volume of water comprises a submerged spiral prefilter.

4. The filtering apparatus of claim 1 wherein said means for pumping comprises a single submersible pump.

5. The filtering apparatus of claim 1 wherein said means for recycling a portion of said prefiltered water comprises a plurality of drain holes in said water return line.

6. The filtering apparatus of claim 1 wherein said means for biologically filtering said prefiltered water includes a biological filter comprised of a plurality of vertical poly- fiber pads positioned in a non-submerged environment.

7. The filtering apparatus of claim 1 wherein said means for chemically filtering said volume of water comprises a submerged chemical stage filter.

8. The filtering apparatus of claim 1 wherein said concentric tube arrangement comprises an inner inlet tube for connecting said chemical filtering means to said pumping means and an outer inlet tube for connecting said prefiltering means to said pumping means.

9. The filtering apparatus of claim 8 wherein said outer inlet tube comprises a plurality of inlet holes for passing said volume of water from said prefiltering means to said outer inlet tube.

10. A filtering apparatus for use with an aquarium tank comprising, in combination:

a siphon tube for drawing a volume of water from said aquarium tank into said filtering apparatus;

a spiral prefilter for prefiltering said volume of water for removing debris, said spiral prefilter being segregated within said filtering apparatus;

a submersible pump for pumping said prefiltered water to a water return line, said water return line including a plurality of drain holes for recycling a portion of said prefiltered water through said filtering apparatus;

a biological filter for filtering said prefiltered water, said biological filter receiving said recycled portion of said prefiltered water for decomposing biological waste within said volume of water, said biological filter being arranged for parallel operation with said spiral prefilter;

a chemical stage filter for chemically filtering said volume of water, said chemical stage filter receiving said recycled portion of said prefiltered water from said biological filter for removing chemical waste from said volume of water, said chemical stage filter being arranged for series operation with said biological filter and for parallel operation with said spiral prefilter; and a plurality of concentric tubes for maintaining a pair of water levels within said filtering apparatus, said plurality of concentric tubes provided for drawing said volume of water and said recycled portion of said filtered water into said submersible pump, said pair of water levels being provided for simultaneously retaining said submersible pump in a submerged condition and said biological filter in a non-submerged condition.

11. The filtering apparatus of claim 10 wherein said plurality of concentric tubes comprises an inner inlet tube and an outer inlet tube, said inner inlet tube provided for connecting said chemical stage filter to said submersible pump and said outer inlet tube provided for connecting said spiral prefilter to said submersible pump.

12. The filtering apparatus of claim 10 wherein said spiral prefilter includes a penetration for accommodating said plurality of concentric tubes.

13. The filtering apparatus of claim 10 wherein said water return line further includes a regulating hole, said regulating hole cooperating with a flow gate for controlling the flow of said recycled portion of said prefiltered water to said biological filter.

14. The filtering apparatus of claim 10 including means for maintaining said pair of water levels within said filtering apparatus in an equilibrium condition by balancing the ratio of the amount of water entering an outer inlet tube to the amount of water entering an inner inlet tube to the ratio of the amount of water exiting said plurality of drain holes to the amount of water exiting said water return line.

15. A filtering apparatus for use with an aquarium tank comprising, in combination:

a skimmer box in communication with said aquarium tank and said filtering apparatus for removing surface active organic waste from water received from said aquarium tank;

a siphon tube immersed within said skimmer box for drawing a volume of water from said aquarium tank into said filtering apparatus;

a spiral prefilter for prefiltering said volume of water for removing debris, said spiral prefilter being segregated within said filtering apparatus;

a submersible pump for pumping said prefiltered water to a water return line, said water return line including a plurality of drain holes for recycling a portion of said prefiltered water through said filtering apparatus;

a biological filter for filtering said prefiltered water, said biological filter receiving said recycled portion of said prefiltered water for decomposing biological waste within said volume of water, said biological filter prefilter;

a chemical stage filter for chemically filtering said volume of water, said chemical stage filter receiving said recycled portion of said prefiltered water from said biological filter for removing chemical waste from said volume of water, said chemical stage filter being arranged for series operation with said biological filter and for parallel operation with said spiral prefilter; and a plurality of concentric tubes for maintaining a pair of water levels within said filtering apparatus, said plurality of concentric tubes provided for drawing said volume of water and said recycled portion of said filtered water into said submersible pump, said pair of water levels being provided for simultaneously retaining said submersible pump in a submerged condition and said biological filter in a non-submerged condition.

16. The filtering apparatus of claim 15 wherein said skimmer box further includes a plurality of windows for receiving said water from said aquarium tank.

17. The filtering apparatus of claim 16 wherein said plurality of windows are approximately ⅛" in width and 1⅛" in depth.

18. The filtering apparatus of claim 16 wherein said plurality of windows are of sufficient depth to permit removal of said surface active organic waste when said water in said aquarium tank drops to a low level.

19. The filtering apparatus of claim 15 wherein said skimmer box further includes an adjusting gate for controlling the entry of said water from said aquarium tank into said skimmer box, said gate control being dependent upon the level of said water in said aquarium tank.

20. The filtering apparatus of claim 19 wherein said adjusting gate is pivotable about an axis.

* * * * *